United States Patent [19]

Sugita et al.

[11] Patent Number: 4,612,627

[45] Date of Patent: Sep. 16, 1986

[54] DIGITAL SIGNAL COMPOSING CIRCUIT FOR CROSS-FADE SIGNAL PROCESSING

[75] Inventors: Takehiro Sugita, Chigasaki; Akira Sakamoto; Takeshi Fukami, both of Tokyo; Michimasa Komatsubara, Chiba; Akira Shimizu, Atsugi, all of Japan

[73] Assignee: Sony Corporation, Tokyo, Japan

[21] Appl. No.: 560,956

[22] Filed: Dec. 13, 1983

[30] Foreign Application Priority Data

Dec. 27, 1982 [JP] Japan ................. 57-230601

[51] Int. Cl.[4] ............................................. G06F 7/52
[52] U.S. Cl. ..................... 364/736; 364/760
[58] Field of Search ............... 364/736, 734, 723, 757, 364/760

[56] References Cited

U.S. PATENT DOCUMENTS

| | | | |
|---|---|---|---|
| 3,564,226 | 2/1971 | Seligman | 364/736 |
| 3,789,203 | 1/1974 | Catherall et al. | 364/723 |
| 3,919,535 | 11/1975 | Vattvone | 364/760 |
| 3,959,639 | 5/1976 | Köethmann | 364/760 |
| 4,368,433 | 1/1983 | Imazeki | 364/734 |
| 4,455,611 | 6/1984 | Powers | 364/760 |
| 4,467,444 | 8/1984 | Harman, Jr. et al. | 364/736 |
| 4,490,807 | 12/1984 | Chevillat et al. | 364/736 |

Primary Examiner—David H. Malzahn
Attorney, Agent, or Firm—Lewis H. Eslinger; Alvin Sinderbrand

[57] ABSTRACT

A digital signal composing circuit includes a first selector for selecting a plurality of digital data, a second selector for selecting one of the digital data and a feedback signal, a control circuit for controlling the switching of the first and second selectors and an adding circuit for adding outputs of the first and second selectors and supplying the added output to the second selector as the feedback signal wherein the final output is derived from the adding circuit. Thus, without using any multiplier, the signal processing can be widely used in the digital signal processing such as digital volume, cross-fade, fade-in/-out, mixing, linear interpolation and the like.

5 Claims, 34 Drawing Figures

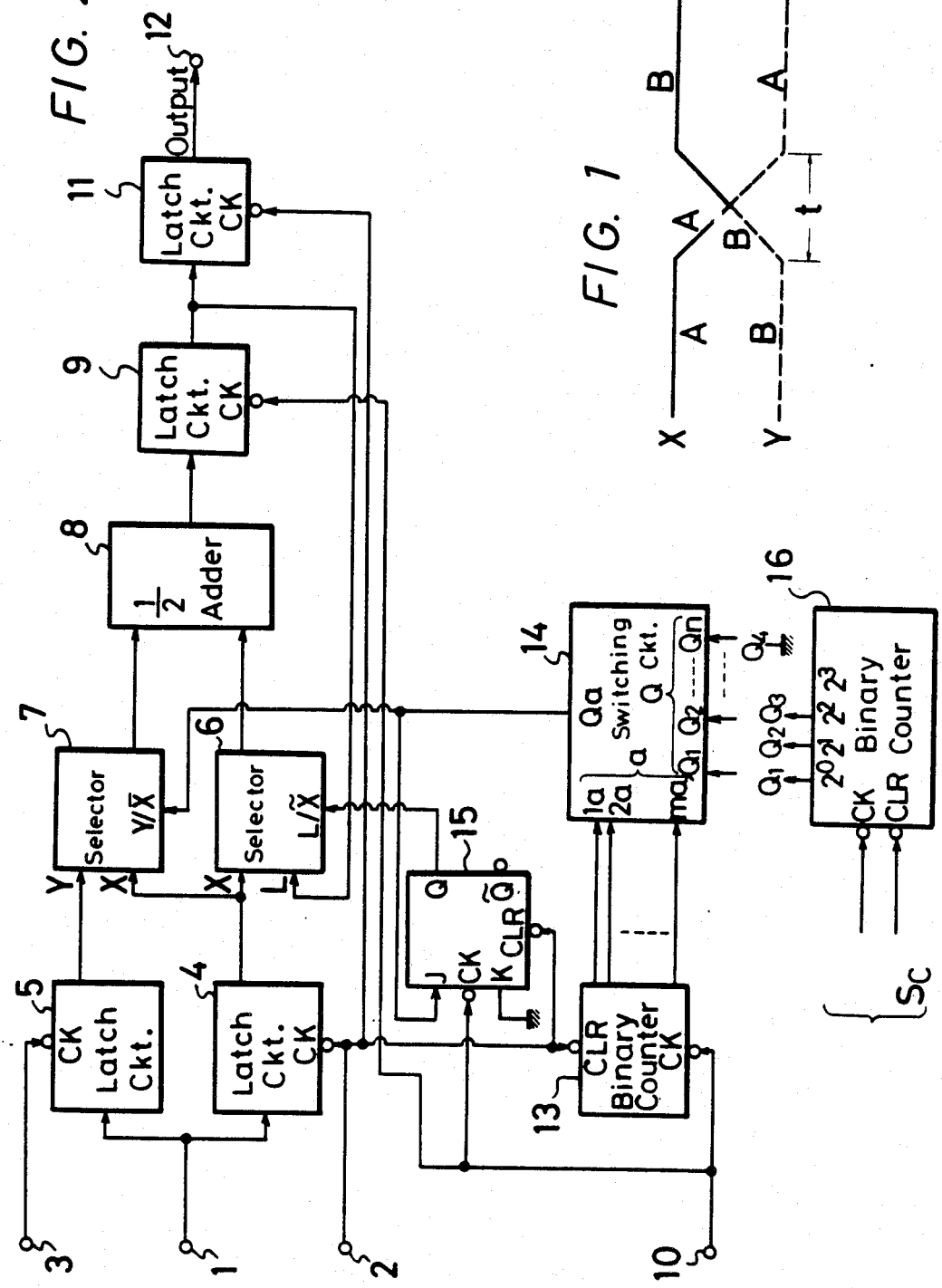
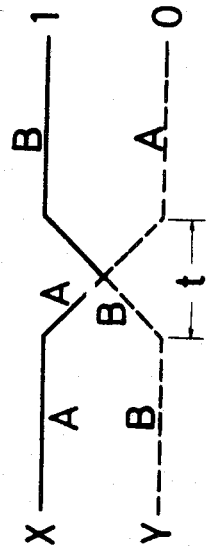

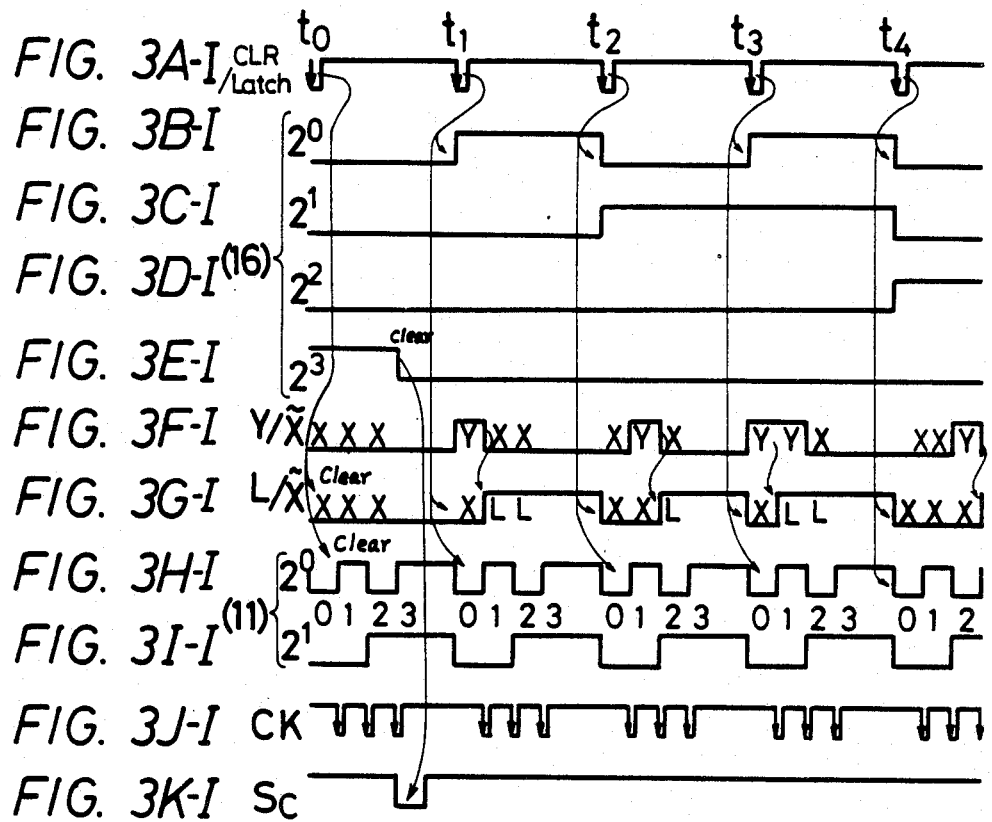

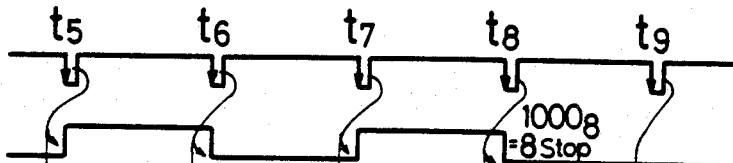

DIGITAL SIGNAL COMPOSING CIRCUIT FOR CROSS-FADE SIGNAL PROCESSING

BACKGROUND OF THE INVENTION

1. Field of the Invention

The present invention relates generally to a digital signal composing circuit and more particularly is directed to a digital signal composing circuit which is suitable for being used in smoothly connecting or mixing a plurality of digital information signals.

2. Description of the Prior Art

In a scrambling system for audio frequency signals and so on in which an audio signal, for example, is divided into blocks, each block being formed of a plurality of segments, the plurality of segments are rearranged on a timebase in a predetermined order at every block and upon reception, these segments are re-arranged in the original arrangement order to restore the original audio signal, if a system such as a VTR (video tape recorder) and the like having a timebase fluctuation exists in the transmission path thereof, when these segments are rearranged at the receiving side, the connected portion between the ends of the segments is displaced so that the original audio signal is distorted, a noise is superimposed upon the original audio signal and so on, thus the quality of the audio signal being deteriorated.

Therefore, as a method for solving the above problem, there is proposed a so-called cross-fade signal processing system in which as, for example, shown in FIG. 1, when digital data X and Y having different contents A and B are connected to each other, near the connection point, one digital data X is gradually decreased in level, while the other digital data Y is gradually increased in level over a predetermined interval (cross-fade period) t so as to connect both the data with each other smoothly.

By the way, a conventional circuit employing such cross-fade signal processing system requires a multiplier to apply the cross-fade so that the construction of the circuitry becomes large in structure. Particularly when this circuit is formed as an IC (integrated circuit), the manufacturing cost thereof is greatly affected so that the circuit becomes very expensive.

OBJECTS AND SUMMARY OF THE INVENTION

Accordingly, it is an object of the present invention to provide an improved digital signal composing circuit which can obviate the above defects inherent in the conventional digital signal composing circuit.

It is another object of the present invention to provide a digital signal composing circuit which can smoothly connect or mix digital data of different contents without using a multiplier.

It is still another object of the present invention to provide a digital signal composing circuit which can suitably be applied to a digital volume, digital signal mixing processing, digital fade-in/-out signal processing system, digital linear interpolation and so on.

It is further object of the present invention to provide a digital signal composing circuit which can be made simple in construction and inexpensive at manufacturing cost.

It is still further object of the present invention to provide a digital signal composing circuit which is quite advantageous particularly when it is formed as an integrated circuit.

According to one aspect of the present invention, there is provided a digital signal composing circuit comprising:

a first selecting means for selecting a plurality of digital data;

a second selecting means for selecting one of the digital data and a feedback signal;

a control means for controlling the switching of the first and second selecting means; and an adding means for adding outputs of the first and second selecting means and supplying the added output to the second selecting means as the feedback signal wherein a final output is derived from the adding means.

The other objects, features and advantages of the present invention will become apparent from the following description taken in conjunction with the accompanying drawings through which the like references designate the same elements and parts.

BRIEF DESCRIPTION OF THE DRAWINGS

FIG. 1 is a diagram useful for explaining a so-called cross-fade signal processing;

FIG. 2 is a systematic block diagram showing an embodiment of a digital signal composing circuit according to the present invention; and FIGS. 3A-I to 3P-I and FIGS. 3A-II to 3P-II are respectively signal waveform diagrams used to explain the operation of the digital signal composing circuit of the present invention shown in FIG. 2, with each of the Figures identified with a Roman numeral II representing a continuation of the corresponding Figure identified with a Roman numeral I.

DESCRIPTION OF THE PREFERRED EMBODIMENT

Before describing an embodiment of a digital signal composing circuit according to the present invention, a fundamental principle of the present invention will be described briefly. To make the digital signal composing circuit of the present invention, a weighted mean value between two digital data X and Y is calculated as $$Z = \frac{K}{2^n} X + \left(1 - \frac{K}{2^n}\right) Y \tag{1}$$

where K is a constant value and n is an arbitrary integer. And, when the weighted coefficient is added with the condition $K/2^n$, a signal processing which can satisfy the above equation (1) is made possible not by the use of a multiplier but by a combination of substantially an adder and selectors described later.

When, now, n is taken as 3, the above equation (1) is extended as follows:

$$\frac{7}{8}X + \frac{1}{8}Y = \frac{1}{2}\left[X + \frac{1}{2}\left[X + \frac{1}{2}[Y+X]\right]\right]$$

$$\frac{6}{8}X + \frac{2}{8}Y = \frac{1}{2}\left[X + \frac{1}{2}[Y+X]\right]$$

$$\frac{5}{8}X + \frac{3}{8}Y = \frac{1}{2}\left[X + \frac{1}{2}\left[Y + \frac{1}{2}[Y+X]\right]\right]$$

$$\frac{4}{8}X + \frac{4}{8}Y = \frac{1}{2}[Y+X] \quad\quad (2)$$

$$\frac{3}{8}X + \frac{5}{8}Y = \frac{1}{2}\left[Y + \frac{1}{2}\left[X + \frac{1}{2}[Y+X]\right]\right]$$

$$\frac{2}{8}X + \frac{6}{8}Y = \frac{1}{2}\left[Y + \frac{1}{2}[Y+X]\right]$$

$$\frac{1}{8}X + \frac{7}{8}Y = \frac{1}{2}\left[Y + \frac{1}{2}\left[Y + \frac{1}{2}[Y+X]\right]\right]$$

As seen in the above, the above equation (1) is expressed by the operation of the addition and the multiplication of $\frac{1}{2}$ (without using the multiplier, this operation can be carried out by only shifting one bit of the data). In the case where n is selected as an integer other than 3, the above equation (1) can be expressed similarly.

The calculation based on the above equation (2) can be realized by switching the inputs to the adder by a selector and by repeatedly using one adder. The practical repeating number thereof is n and the switching of the inputs is carried out by a predetermined switching control signal.

Now, in embodiment of the digital signal composing circuit according to the present invention will hereinafter be described in detail with reference to FIG. 2 and FIGS. 3A-I to 3P-I and 3A-II to 3P-II, for the case where two digital data are processed by a cross-faded with seven samples, by way of example.

FIG. 2 is a systematic block diagram showing a circuitry of this embodiment according to the present invention. In FIG. 2, reference numeral 1 designates a data input terminal to which two digital data X and Y are supplied sequentially or serially. The digital data X and Y from this input terminal 1 are supplied to and latched in latch circuits 4 and 5 at every sample in response to latch clock signals supplied from a timing circuit (not shown) through latch terminals 2 and 3 to the latch circuits 4 and 5. For example, each time when the clock signal from the latch terminal 2 is supplied to the latch circuit 4, the digital data X in the digital data X and Y from the input terminal 1 is latched in the latch circuit 4, while each time when the clock signal from the latch terminal 3 is supplied to the latch circuit 5, the digital data Y of the digital data X and Y from the input terminal 1 is latched in the latch circuit 5. Regarding the latch clock signals supplied to the latch circuits 5 and 4, the former preceeds by one clock the latter. Of course, when the data X and Y supplied to the latch circuits 4 and 5 are respectively supplied through independent data lines, it is possible that the clock signals from the latch terminals 2 and 3 are the same in timing.

The output signal from the latch circuit 5 is supplied to a selector 7, while the output signal from the latch circuit 4 is supplied to both of the selectors 6 and 7. The selector 6 is supplied with as a feedback signal the output signal from a latch circuit 9 provided at the output side of a half ($\frac{1}{2}$) adder 8 which adds the output signals from the selectors 6 and 7 to each other. As the latch clock signal for the latch circuit 9, there is used a clock signal which is supplied to a clock terminal 10. These selectors 6 and 7 are operated to switch the signals appearing at their input sides in response to the logic level of the switching control signal which will be described later. By way of example, the selector 7 delivers the output data Y of the latch circuit 5 when the level of the switching control signal to be supplied to its control terminal $Y/\overline{X}$ is "1", while the selector 7 delivers the output data X of the latch circuit 4 when the level of the switching control signal is "0". On the other hand, the selector 6 delivers the output data L of the latch circuit 9 when the level of the switching control signal to be supplied to its control terminal $L/\overline{X}$ is "1", while the selector 6 delivers the output data $\overline{X}$ of the latch circuit 4 when the level of the switching control signal is "0".

A latch circuit 11 is provided at the output side of the latch circuit 9, and a clock signal same as the clock signal supplied to the latch terminal 2 is used as the latch clock of this latch circuit 11. Then, from the output side of the latch circuit 11 is led out an output terminal 12.

As a control means for controlling the switching operation of the selectors 6 and 7, there is employed a circuitry which is formed of, for example, a binary counter 13, a switching circuit 14 and a JK flip-flop circuit 15. The latch clock signal from the latch terminal 2 is supplied to a clear terminal CLR of the binary counter 13 as the clear signal at every sample, while the clock signal from the clock terminal 10 is supplied to a clock terminal CK thereof. The clock signal from the above latch terminal 2 is supplied to a clear terminal CLR of the JK flip-flop circuit 15 as the clear signal, while the clock signal same as that of the binary counter 13 is supplied to a clock terminal CK of the JK flip-flop circuit 15.

The switching circuit 14 is supplied at its input terminals $Q_1$ to $Q_n$ with switching information signals corresponding to the signal processing mode of the circuit of this embodiment. By the way, this embodiment is used for the signal processing mode in which the cross-fade mode is carried out. If, for example, the cross-fade period is taken as a duration of 7 samples, the switching signal of at least 3 bits is supplied from a binary counter 16 to the input terminal Q ($Q_1$ to $Q_3$) of the switching circuit 14. This switching information signal is supplied to a control terminal a (1a to ma) of the switching circuit 14. The switching information signal is sequentially selected in response to the output signal from the binary counter 13 (where 2 bits to be supplied to the control terminals 1a and 2a are employed) and then supplied through the output terminal Qa to the control terminal $Y/\overline{X}$ of the selector 7 as the switching control signal. The same clock signal as the clock signal from the latch terminal 2 is used as the clock signal of the binary counter 16, while a cross-fade start signal Sc (FIGS. 3K-I and 3K-II) generated when the cross-fade processing is started is used as the clear signal of the binary counter 16. The input terminal $Q_4$ of the switching circuit 14 corresponding to an output $2^3$ from the binary counter 16 is fixed to either "1" or "0", for example, "0" in this embodiment.

The switching control signal from the switching circuit 14 is also supplied to an input terminal J of the JK flip-flop circuit 15. Since an output terminal Q of this JK flip-flop circuit 15 is "0" level at the initial setting mode, the selector 6 is controlled so as to deliver therefrom the output data X derived from the latch circuit 4 in response to the switching control signal. On the other hand, under the state that the switching control signal from the switching circuit 14 is "1", namely, the level of the input signal at the input terminal J of the JK flip-flop circuit 15 is "1", if the clock signal is supplied from the clock terminal 10 to the clock terminal CK of the JK flip-flop circuit 15, the level of its output terminal Q becomes "1" so that at this time, the selector 6 is controlled by the switching control signal so as to deliver therefrom the output data L of the latch circuit 9. The state under which the level of the output terminal Q of the JK flip-flop circuit 15 is "1" is maintained until the clear signal supplied from the terminal 2 at each sample is applied to the clear terminal CLK thereof.

The operation of the digital signal composing circuit shown in FIG. 2 will be described with reference to the signal waveforms shown in FIGS. 3A-I to 3P-I and 3A-II to 3P-II.

Two digital data X and Y respectively shown in FIGS. 3L-I, 3L-II, and 3M-I, 3M-II are supplied through the input terminal 1 to the latch circuits 4 and 5, while to the clock terminals CK of these latch circuits 4 and 5 are respectively supplied from the latch terminals 2 and 3 the latch clock signals are shown in FIG. 3A-I and FIG. 3A-II, which are delayed by one clock at each sample (the latch clock signal at the terminal 3 side is ahead of that at the terminal 2), and in response to these clock signals, first, the content of the digital data Y is latched in the latch circuit 5 and subsequently the content of the digital data X is latched in the latch circuit 4. The clear signal similar to the clock signal as shown in FIG. 3A-I and FIG. 3A-II is supplied through the latch terminal 2 to the clear terminals CLR of the binary counter 13 and the JK flip-flop circuit 15 so that the binary counter 13 and the JK flip-flop circuit 15 are cleared at each sample.

From the clock terminal 10, for example, three clock signals in one sample as shown in FIG. 3J-I, 3J-II are supplied to the clock terminal CK of the binary counter 13 so that in synchronism with these clock signals two bit signals as shown in FIGS. 3H-I, 3H-II and 3I-I, 3I-II are supplied to the control terminals 1a and 2a of the switching circuit 14.

On the other hand, the switching circuit 14 is supplied at its input terminal Q with switching information signals of 3 bits as shown in FIGS. 3B-I, 3B-II to 3D from the binary counter 16. These switching information signals of 3 bits are selected by the output signal from the binary counter 13 and then supplied through the output terminal Qa of the switching circuit 14 to the control terminal Y/X̄ of the selector 7 as a switching control signal as shown in FIG. 3F-I, 3F-II. Namely, when the output (2 bits) from the binary counter 13 is 0 [0 0] as shown in FIGS. 3H-I, 3H-II and 3I-I, 3I-II, of the switching informations [$2^0$, $2^1$, $2^2$] shown in FIGS. 3B-I, 3B-II, to 3D-I, 3D-II supplied to the input terminals $Q_1$ to $Q_3$ of the switching circuit 14 from the binary counter 16, the information of $2^0$ is delivered from the switching circuit 14, when 1 [1 0], the information of $2^1$ delivered from the switching circuit 14 and when 2 [0 1], the information of $2^2$ is delivered from the switching circuit 14. As a result, the switching control signals of 3 bits [$2^0$, $2^1$, $2^2$] in one sample are generated from the switching circuit 14. Namely, in one sample, the calculations are carried out three times (which means the state of n=3 in the above equation (1)). This switching control signal from the switching circuit 14 is also supplied to the input terminal J of the JK flip-flop circuit 15 so that in response to the supply of the clock signal from the clock terminal 10 to its clock terminal CK, which is same as that supplied to the binary counter 13, the switching control signal is delivered through its output terminal Q to the selector 6 as the switching control signal as shown in FIGS. 3G-I and 3G-II.

Accordingly, during a period from time point $t_0$ to that $t_1$ as shown in FIG. 3A-I and FIG. 3A-II in which the cross-fade period is not yet reached, the switching information signal to be supplied to the switching circuit 14 is [0 0 0] as will be clear from FIGS. 3B-I, 3B-II to 3D-I, 3D-II. As a result, the switching control signal to be supplied to the selector 7 is also [0 0 0] as shown in FIG. 3F-I and FIG. 3F-II so that during this period the selector 7 generates the data X latched in the latch circuit 4. Meanwhile, since the level of the output terminal Q of the JK flip-flop circuit 15 is normally "0" and the switching control signal to the selector 6 is [0 0 0] as shown in FIG. 3G-I and FIG. 3G-II, also the selector 6 selects and delivers the data X latched in the latch circuit 4 during this period. The data X from the selectors 6 and 7 are added in the half adder 8 and then latched in the latch circuit 9 as the data X. If, now, the contents of the data X and Y are respectively taken as those shown in FIG. 3L-I, FIGS. 3L-II, and 3M-I, FIG. 3M-II, during this calculation period, the content A(n−1) of the data X is latched in the latch circuit 9. FIGS. 3N-I, 3N-II and 3P-I, 3P-II respectively show the sequential orders of three calculations carried out during each sample period and the contents in the latch circuit 9 in correspondence therewith. During the period from time points $t_0$ to $t_1$, the content A(n−1) of the data X is latched sequentially in the latch circuit 9 at each of the first ①, second ② and third ③ calculations and then fed back to the other input side of the selector 6 at every calculation as the data L. Then, at time point $t_1$ when the clock signal from the latch terminal 2 is supplied to the latch circuit 11, the final result in the latch circuit 9 is latched in the latch circuit 11. Accordingly, at the output terminal 12 appears an output data A(n−1) corresponding to the data X at that time as shown in FIG. 3O-I, FIG. 3O-II. Namely, during this period, one digital data X are all delivered to the output terminal 12.

During the period from time points $t_0$ to $t_1$, the cross-fade start signal Sc as shown in FIG. 3K-I, FIG. 3K-II is produced and supplied to the clear terminal CLR of the binary counter 16, and hence the content thereof is cleared as shown in FIG. 3E-I, FIG. 3E-II. At time point $t_1$, similarly as above, in response to the latch signals as shown in FIG. 3A-I, FIG. 3A-II from the latch terminals 2 and 3, the digital data X and Y from the input terminal 1 are respectively latched in the latch circuits 4 and 5 and the content of the binary counter 13 is cleared by the clock signal from the latch terminal 2 as shown in FIG. 3H-I and FIG. 3H-II and also the content of the JK flip-flop circuit 15 is cleared by the same clock signal.

During the period from time points $t_1$ to $t_2$, the switching information signal [1 0 0] is supplied to the input terminal Q of the switching circuit 14 as will be clear from FIGS. 3B-I, 3B-II to 3D-I, 3D-II. Then, in response thereto, from the output terminal Qa thereof, the switching control signal of [1 0 0] as shown in FIG. 3F-I and FIG. 3F-II is supplied to the control terminal Y/X̄ of the selector 7. The JK flip-flop circuit 15 is supplied at its input terminal J with the signal of "1" from the switching circuit 14 when the level of the output terminal Q of the JK flip-flop circuit 15 is "0" in the initial state as described above. After the level of the output terminal Q thereof is changed to "1" in response to the clock signal supplied from the clock terminal 10, this state is maintained until the succeeding clear signal is applied thereto. As a result, during the period from time points $t_1$ to $t_2$, the switching control signal [0 1 1] as shown in FIG. 3C-I and FIG. 3C-II is supplied to the control terminal $L/\overline{X}$ of the selector 6.

Consequently, the calculation processing at that time is considered for each bit. In the least significant bit (LSB), the switching control signals supplied to the selectors 6 and 7 are respectively "0" and "1" as will be clear from FIGS. 3G-I, 3G-II and 3F-I, 3F-II so that the selectors 6 and 7 respectively select and deliver the data X and Y latched in the latch circuits 4 and 5. These data X and Y are added by the succeeding half adder 8 so as to become the data $\frac{1}{2}[Y+X]$ and then latched in the latch circuit 9. Namely, at that time, in the latch circuit 9 is latched the data of $\frac{1}{2}[B(0)+A(n)]$ as will be clear from FIGS. 3N-I, 3N-II, and 3P-I, 3P-II. In the more significant bit (or second order bit), the switching control signals supplied to the selectors 6 and 7 are respectively "1" and "0" so that at this time the selector 6 delivers the data $\frac{1}{2}[Y+X]$ latched in the latch circuit 9, while the selector 7, this time, delivers the data X latched in the latch circuit 4. These data $\frac{1}{2}[Y+X]$ and X are added together by the half adder 8, made as $\frac{1}{2}[X+\frac{1}{2}[Y+X]]$ and then latched in the latch circuit 9. In other words, at this time, data $\frac{1}{2}[A(n)+\frac{1}{2}[B(0)+A(n)]]$ is latched in the latch circuit 9 as will be clear from FIGS. 3N-I, 3N-II and 3P-I, 3P-II. In the next more significant bit (or third order bit), similarly as the second order bit, the switching control signals supplied to the selectors 6 and 7 are respectively "1" and "0" so that the selector 6 delivers the data of $\frac{1}{2}[X+\frac{1}{2}[Y+X]]$ latched in the latch circuit 9, while the selector 7 delivers the data X latched in the latch circuit 4. These data are added together by the half adder 8, made as data of $\frac{1}{2}[X+\frac{1}{2}[X+\frac{1}{2}[Y+X]]]$, namely, data of $\frac{7}{8}X+\frac{1}{8}Y$ and then latched in the latch circuit 9. At this time, in the latch circuit 9 is latched data of $\frac{1}{2}[A(n)+\frac{1}{2}[A(n)+\frac{1}{2}[B(0)+A(n)]]]$ as will be seen from FIGS. 3N-I, 3N-II, and 3P-I, 3P-II. Accordingly, the final result of the latch circuit 9 at this time is latched in the latch circuit 11 by the next latch signal at time point $t_2$. Therefore, at this time, at the output terminal 12 appears data of $\frac{7}{8}A(n)+\frac{1}{8}B(0)$ as shown in FIG. 3O-I and FIG. 3O-II.

In this way, the calculation processing of one sample period during the period from time points $t_1$ to $t_2$ is carried out.

During the period from time points $t_2$ to $t_3$, the switching control signals for the selectors 6 and 7 are respectively [0 0 1] and [0 1 0]. Thus, when the calculation processing same as above is carried out while sequentially switching the selectors 6 and 7, the calculated result during this sampling period is latched in the latch circuit 9 as the data of $(6/8)X+(2/8)Y$. As a result, at that time, the data of $(6/8)A(n+1)+(2/8)B(1)$ and appears at the output terminal 12 as shown in FIG. 3O-I and FIG. 3O-II.

Only the switching control signals for the selectors 6 and 7 during each sampling period and the data appearing at the output terminal 12 will be shown hereinafter. As will be clear from FIGS. 3F-I, 3F-II and 3G-I, 3G-II and FIGS. 3O-I, 3O-II, during the period from time points $t_3$ to $t_4$, [0 1 1], [1 1 0] and $\frac{5}{8}A(n+2)\frac{3}{8}B(2)$, during the period from time points $t_4$ to $t_5$, [0 0 0], [0 0 1] and $(4/8)A(n+3)+(4/8)B(3)$, during the period from time points $t_5$ to $t_6$, [0 1 1], [1 0 1] and $\frac{3}{8}A(n+4)+\frac{5}{8}B(4)$, during the period from time points $t_6$ to $t_7$, [0 0 1], [0 1 1] and $(2/8)A(n+5)+(6/8)B(5)$ and during the period from time points $t_7$ to $t_8$ which is the final sampling period immediately before the last data X is switched to the data Y, [0 1 1], [1 1 1] and $\frac{1}{8}A(n+6)+\frac{7}{8}B(6)$. The content of the data latched in the latch circuit 9 at every calculation processings during each sampling period will be considered with reference to especially the period from time points $t_4$ to $t_5$ and the period from time points $t_6$ to $t_7$. As will be understood from FIGS. 3L-I, 3L-II, and 3P-I, 3P-II, during the former period, ①=A(n+3), ②=A(n+3) and ③=$\frac{1}{2}[B(3)+A(n+3)]$, while during the latter period, ①=A(n+5), ②=$\frac{1}{2}[B(5)+A(n+5)]$ and ③=$\frac{1}{2}[B(5)+\frac{1}{2}[B(5)+A(n+5)]]$.

At time point $t_8$ when the cross-fade period is ended, the switching information signal supplied to the input terminal Q of the switching circuit 14 becomes [0 0 0] as shown in FIGS. 3B-I, 3B-II to 3D-I, 3D-II so that the switching control signal to the selector 7 becomes [0 0 0] as shown in FIG. 3F-I and FIG. 3F-II. In association therewith, the switching control signal to the selector 6 also becomes [0 0 0] as shown in FIG. 3G-I and FIG. 3G-II with the result that both the selectors 6 and 7 deliver the data latched in the latch circuit 4. After the interpolation processing of data is ended, the latch circuit 4 is operated in such a manner that of the two digital data A and B supplied thereto from the input terminal 1, the digital data B is latched as the data X. Accordingly, after time point $t_8$, the data X is supplied through the selectors 6 and 7 to the half adder 8, added together therein and then latched in the latched circuit 9 as the data X. The content of the data X latched in the latch circuit 9 during the period from time points $t_8$ to $t_9$ is presented all as B(7) through three calculations as will be seen from FIGS. 3L-I, 3L-II, and 3P-I, 3P-II. This final result is latched in the latch circuit 11 in response to the next clock signal so that at the output terminal 12 appears the output data B(7) as shown in FIG. 3O-I, FIG. 3O-II.

As described above, the digital data having different contents can be connected smoothly and then delivered.

While in the above embodiment the present invention is applied to the case of the cross-fade signal processing, the present invention is not limited to the above application but can be applied to other example such as digital volume, digital mixing, digital fade-in/fade-out processing or digital linear interpolation processing and so on. Namely, in the case of the digital volume processing, the amplitude of the signal can be adjusted to as high as $K/2^n$ times. In that case, if the data X is selected to be zero, the signal sample is set in the data Y, the information regarding K is set in the input terminal Q of the switching circuit 14 and after the binary counter 13 is cleared the clock signal is applied n times, at the output terminal 12 appears the signal data which is multiplied by $K/2^n$. The above operation is repeated for each signal sample. In the case of the digital mixing processing, if one more signal sample is added to the data X which is set to zero in the digital volume, the data X and Y can be mixed with each other with the ratio of $(1-K/2^n):K/2^n$. Moreover, in the case of the digital fade-in/fade-out processing, the switching information is set in the input terminal Q of the switching circuit 14 and although in the cross-fade operation, the signal samples are set in both the data X and Y, in this case, the signal sample is set in only the data Y and the data X is made zero. Thus, the fade-in signal processing is presented. Further, in the case of the digital/linear interpolation, if the values at both ends of the interpolation interval are set in the data X and Y, respectively, and the switching information supplied to the input terminal Q of the switching circuit 14 is sequentially selected by the binary counter 13, it is possible to obtain a value which is provided by linearly interpolating the data X and Y.

As set forth above, according to the present invention, in the case of the signal processing such as connecting the plurality of digital data X and Y and so on, the weighted mean value $Z=(K/2^n)X+(1-K/2^n)Y$ is obtained. At that time, the weighted coefficient is taken as $K/2^n$ and the addition of data can be performed by the multiplication of $\frac{1}{2}$. Therefore, a multiplier which causes the structure of the circuit to be made large in the prior art can be removed. As a result, the circuitry can be made simple in construction and inexpensive at manufacturing cost, bringing about a great advantage particularly when the digital signal composing circuit is formed as the integrated circuit (IC).

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A digital cross-fader circuit for cross-fading from a first digital signal to a second digital signal, comprising:
   first selecting means responsive to a first control signal for supplying either of said first and second digital signals as a first selected signal;
   second selecting means responsive to a second control signal for supplying one of said first digital signal and a summed signal as a second selected signal;
   adding means for receiving said first and second selected signals and for adding one-half of said first selected signal and one-half of said second selected signal to produce said summed signal;
   signal output means for supplying an output signal in response to said summed signal; and
   controller means for producing said first and second control signals so that said output signal from said signal output means cross-fades from said first digital signal to said second digital signal.

2. The circuit of claim 1; wherein said adding means includes latch means for supplying said summed signal to said second selecting means.

3. A digital cross-fader circuit for cross-fading from a first digital signal to a second digital signal, comprising:
   first selecting means responsive to a first control signal for supplying either of said first and second digital signals as a first selected signal;
   second selecting means responsive to a second control signal for supplying one of said first digital signal and a summed signal as a second selected signal;
   adding means for receiving said first and second selected signals and for adding one-half of said first selected signal and one-half of said selected signal to produce said summed signal;
   signal output means for supplying an output signal in response to said summed signal; and
   controller means for producing said first and second control signals so that said output signal from said signal output means cross-fades from said first digital signal to said second digital signal;
   wherein said adding means includes latch means for supplying said summed signal to said second selecting means; and
   wherein said controller means includes binary counter means for fading out said first digital signal and fading in said second digital signal over a predetermined cross-fade interval.

4. The circuit of claim 3; wherein said controller means includes switching circuit means for selectively supplying said first control signal to said first selecting means in response to a switching information signal; and second binary counter means for generating said switching information signal.

5. The circuit of claim 3; wherein said controller means includes means for generating said second control signal for said second selecting means.

* * * * *